(12) United States Patent
Ikeda et al.

(10) Patent No.: US 9,878,247 B2
(45) Date of Patent: Jan. 30, 2018

(54) COMMENT DISPLAY-CAPABLE GAME SYSTEM, COMMENT DISPLAY CONTROL METHOD AND STORAGE MEDIUM

(71) Applicant: Konami Digital Entertainment Co., Ltd., Minato-ku, Tokyo (JP)

(72) Inventors: Yuto Ikeda, Minato-ku (JP); Kenichi Yamamoto, Minato-ku (JP); Yoshiaki Kawano, Minato-ku (JP)

(73) Assignee: KONAMI DIGITAL ENTERTAINMENT CO., LTD., Minato-Ku, Tokyo (JP)

(*) Notice: Subject to any disclaimer, the term of this patent is extended or adjusted under 35 U.S.C. 154(b) by 178 days.

(21) Appl. No.: 14/629,056

(22) Filed: Feb. 23, 2015

(65) Prior Publication Data

US 2015/0165324 A1    Jun. 18, 2015

Related U.S. Application Data

(63) Continuation of application No. PCT/JP2013/063031, filed on May 9, 2013.

(30) Foreign Application Priority Data

Sep. 27, 2012  (JP) ................. 2012-214597

(51) Int. Cl.
*A63F 9/24* (2006.01)
*A63F 13/00* (2014.01)
(Continued)

(52) U.S. Cl.
CPC .............. *A63F 13/53* (2014.09); *A63F 13/35* (2014.09); *A63F 13/533* (2014.09); *A63F 13/87* (2014.09); *A63F 2003/00996* (2013.01)

(58) Field of Classification Search
None
See application file for complete search history.

(56) References Cited

U.S. PATENT DOCUMENTS 6,054,989 A * 4/2000 Robertson ........... G06F 3/04815
                                                       715/727
6,241,524 B1 * 6/2001 Aoshima ................ A63F 13/10
                                                       434/118
(Continued)

FOREIGN PATENT DOCUMENTS

JP      3934649 B2   6/2007
JP      4252608 B2   4/2009
(Continued)

OTHER PUBLICATIONS

International Search Report (PCT/JP2013/063031); dated Aug. 13, 2013.
(Continued)

*Primary Examiner* — Kevin Y Kim
(74) *Attorney, Agent, or Firm* — Howard & Howard Attorneys PLLC

(57) ABSTRACT

A game system is provided that implements comment display so as not to interfere with operation when a player operates the game. This game system includes a game machine upon which a player plays a game. At least one comment which is to be displayed according to the circumstances of the game on the game machine are displayed to the player upon a game screen. A determination is made as to whether or not the player is being requested to perform an operation in the game, and a predetermined limitation is imposed upon the display of the at least one comment on the basis of the result of this determination.

9 Claims, 7 Drawing Sheets

(51) Int. Cl.
*G06F 17/00* (2006.01)
*G06F 19/00* (2011.01)
*A63F 13/53* (2014.01)
*A63F 13/35* (2014.01)
*A63F 13/533* (2014.01)
*A63F 13/87* (2014.01)
*A63F 3/00* (2006.01)

(56) References Cited

U.S. PATENT DOCUMENTS

| | | | | |
|---|---|---|---|---|
| 6,344,863 | B1 * | 2/2002 | Capelli | G06F 3/04815 715/764 |
| 6,755,743 | B1 * | 6/2004 | Yamashita | A63F 13/005 463/40 |
| 7,386,799 | B1 * | 6/2008 | Clanton | A63F 13/12 715/753 |
| 2002/0025853 | A1 | 2/2002 | Kojima et al. | |
| 2004/0157661 | A1 * | 8/2004 | Ueda | A63F 13/10 463/31 |
| 2004/0198497 | A1 | 10/2004 | Yamashita et al. | |
| 2004/0198498 | A1 | 10/2004 | Yamashita et al. | |
| 2005/0209008 | A1 | 9/2005 | Shimizu et al. | |
| 2009/0102975 | A1 * | 4/2009 | Arai | A63F 13/10 348/589 |
| 2009/0143141 | A1 * | 6/2009 | Wells | G07F 17/32 463/37 |
| 2010/0217798 | A1 | 8/2010 | Asami | |
| 2013/0130794 | A1 | 5/2013 | Oshima et al. | |

FOREIGN PATENT DOCUMENTS

| | | |
|---|---|---|
| JP | 2010-131082 A | 6/2010 |
| JP | 2011-5306 A | 1/2011 |
| JP | 2011-110323 A | 6/2011 |
| JP | 2012-34792 A | 2/2012 |
| KR | 20010092351 | 10/2001 |
| KR | 10-2007-0106562 | 11/2007 |
| KR | 20090000242 | 1/2009 |

OTHER PUBLICATIONS

Japanese Office Action with English Translation; dated Aug. 6, 2013.

Chat on a novice topic in a topic of 178 Website's "World of Warcraft"; Release time: Jul. 11, 2012; URL: http://wow.178.com/201207/135981607810.html (English Translation First and then Chinese).

Chinese Office Action (English Translation and Original Chinese Document), dated Feb. 16, 2017.

* cited by examiner

COMMENT DISPLAY-CAPABLE GAME SYSTEM, COMMENT DISPLAY CONTROL METHOD AND STORAGE MEDIUM

CROSS-REFERENCE TO RELATED APPLICATION

This application is a continuation of PCT Application No. PCT/JP2013/063031, filed May 9, 2013, which claims priority to Japanese Patent Application No. 2012-214597, filed Sep. 27, 2012, the disclosures of which are hereby incorporated by reference in their entirety.

TECHNICAL FIELD

The present invention relates to a game system that is endowed with a function of displaying comments upon a game screen, and so on.

BACKGROUND ART

In recent years network services, as represented by SNS (an abbreviation of "social networking service") which are systems that implement communication between users via networks, have become very widespread. The field of game systems is no exception to this: for example, a game system has been proposed which is capable of exchanging comments between a plurality of home-use game machines that are connected to a network (for example, refer to Patent Document #1). And a system has also been proposed that implements simulated communication between commercial game machines that are connected to a network, in which appropriate dialog corresponding to the state of a game is selectively transmitted and received (for example, refer to Patent Document #2).

CITATION LIST

Patent Literature

Patent Document #1: Japanese Laid-Open Patent Publication 2011-005306 and Patent Document #2: Japanese Laid-Open Patent Publication 2010-131082.

SUMMARY OF INVENTION

Technical Problem

Even if a comment is displayed upon the game screen, it is difficult for the player to check the content of the comment when the player is operating the game. Moreover, when the player is operating the game, there is a fear that the player will not be able to concentrate upon the game if a comment is displayed in a prominent manner upon the game screen, or if a comment is scrolled.

Accordingly, the object of the present invention is to provide a game system and so on, that implements display of comments in a way that does not provide any hindrance to the operation of the player when the player is operating the game.

Solution to Technical Problem

The game system of the present invention solves the problem described above by providing a game system including a game apparatus upon which a user is enabled to play a game, the game system comprising: a comment display control device configured to display at least one comment upon a game screen to be displayed according to a state of the game upon the game apparatus, wherein the comment display control device comprises: an operation request determination device configured to determine whether or not a request is being made to the user to operate the game; and a display limitation device configured to impose a predetermined limitation upon the comment display on the basis of the result of determination by the operation request determination device.

Moreover, the comment display control method of the present invention solves the problem described above by providing a comment display control method for a game system including a game apparatus upon which a user is enabled to play a game, and configured to display at least one comment upon a game screen to be displayed according to a state of the game upon the game apparatus, comprising: an operation request determination step of determining whether or not a request is being made to the user to operate the game; and a display limitation step of imposing a predetermined limitation upon the comment display on the basis of the result of determination by the operation request determination step.

And the storage medium of the present invention solves the problem described above by providing a storage medium storing a computer program to cause a computer of a game system including a game apparatus upon which a user is enabled to play a game to function as, a comment display control device configured to display at least one comment upon a game screen to be displayed according to a state of the game upon the game apparatus, wherein the comment display control device comprises: an operation request determination device configured to determine whether or not a request is being made to the user to operate the game; and a display limitation device configured to impose a predetermined limitation upon the comment display on the basis of the result of determination by the operation request determination device.

According to the present invention, the display of comments upon the game screen is limited when the user (i.e. the player) is operating the game. In other words, when the user is operating the game, the user is able to concentrate upon the operation of the game, because the comments do not stand out prominently. Accordingly the operability of the game can be enhanced.

In the present invention, "comment" means anything of which the user can ascertain or can interpret the meaning of the content via the user's sight sense, and, provided that it can be interpreted in this manner, "message" is included in the concept of "comment" even though it may be expressed by a different term. Moreover, "comment" is not only limited to being a string composed of letters; it could also include at least one pictorial element such as a pictograph, a symbol, or the like.

As one aspect of the game system of the present invention, on the basis of the result of determination by the operation request determination device, the display limitation device makes the at least one comment translucent. Since according to this aspect, the comments are made translucent when the user is operating the game, accordingly the comments do not stand out prominently upon the game screen.

In this aspect in which the comments are made translucent, the comment display control device may shift the at least one comment in a predetermined direction, and on the basis of the result of determination by the operation request determination device, the display limitation device may make a shifting speed of the at least one comment lower, as compared with when no request to operate the game is being made. Since according to this aspect, the shifting speed of the comments is reduced when the user is operating the game, accordingly the comments that are shifting over the game screen do not stand out so prominently. Moreover, in this aspect, it would also be possible for the display limitation device to stop the shifting of the at least one comment, on the basis of the result of determination by the operation request determination device.

And, as one aspect of the game system of the present invention, the comment display control device may shift the at least one comment in a predetermined direction; and on the basis of the result of determination by the operation request determination device, the display limitation device may make the number of the at least one comment appearing newly upon the game screen lower, as compared with when no request to operate the game is being made. According to this aspect, when the user is operating the game, the number of new comments appearing upon the game screen is reduced. Due to this, the user is enabled to maintain the user's concentration upon the game.

As a further aspect of the game system of the present invention, the comment display control device may perform pop-up display of the at least one comment upon the game screen; and the display limitation device may interrupt the pop-up display of the at least one comment appearing newly upon the game screen, on the basis of the result of determination by the operation request determination device. According to this aspect, when the user is operating the game, pop-up display of new comments upon the game screen ceases. Due to this, the user is enabled to maintain the user's concentration upon the game.

And, as a yet further aspect of the game system of the present invention, the comment display control device may further comprise a limitation cancellation device configured to cancel the limitation by the display limitation device, when a predetermined cancellation condition is satisfied. According to this aspect, the wish of the user is implemented if the user wants to give priority to display of comments even though the user is operating the game, or if due to the contents of the game the user wants not to give priority to display of comments, so that, by entrusting the user with this selection, the flexibility to operate the game is enhanced.

DESCRIPTION OF EMBODIMENTS

Figure 1:
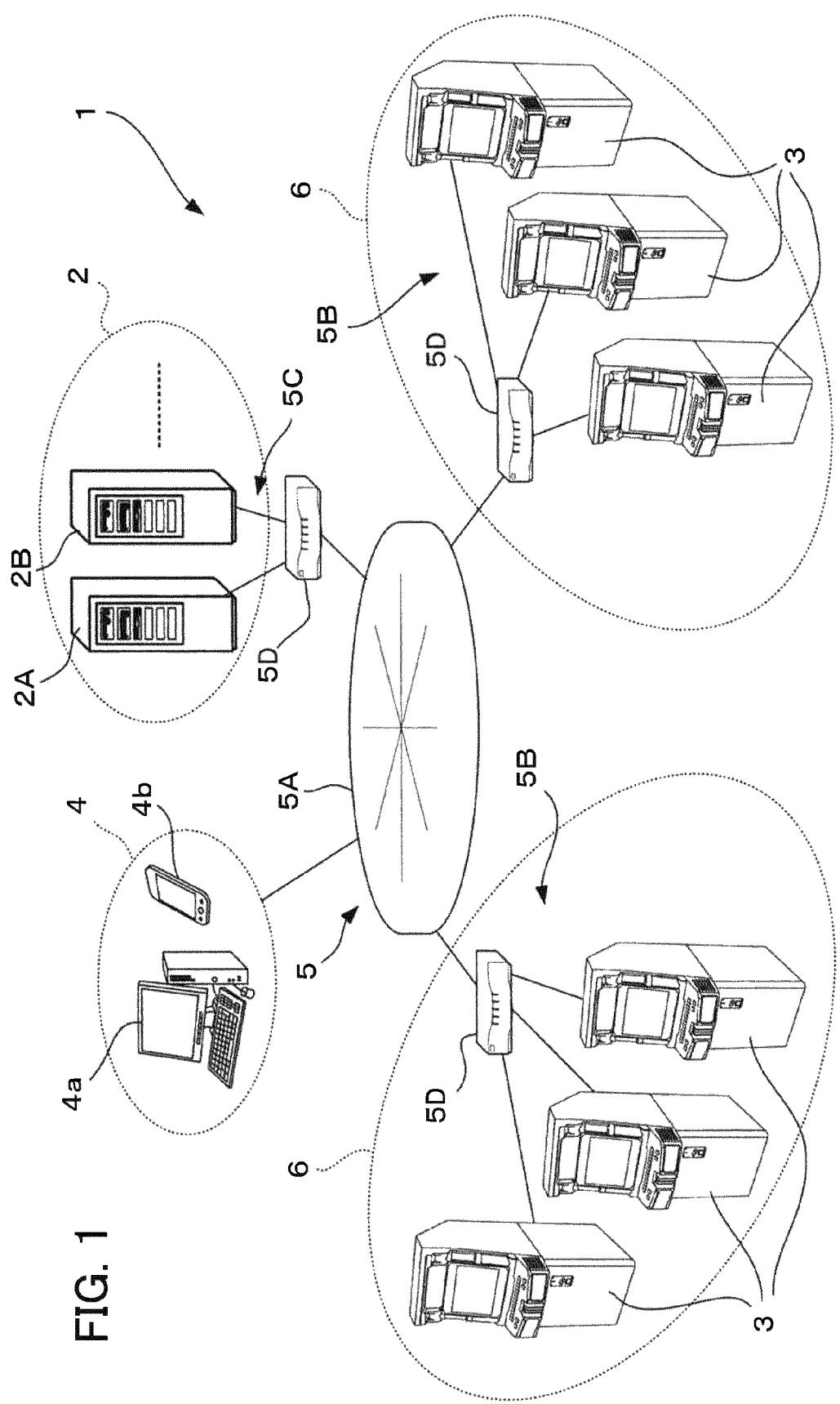
FIG. 1 is a figure showing the overall structure of a game system according to an embodiment of the present invention.

FIG. 1 is a figure showing the overall structure of a game system according to an embodiment of the present invention. This game system 1 includes a center server 2 which is a server device, and game machines 3 (corresponding to the "game apparatus" of the Claims) and user terminal devices 4 that serve as client devices that can be connected to the center server 2 via a predetermined network 5. The center server 2 is constructed as a single logical server device by a plurality of server units 2A, 2B, . . . being combined together. However, it would also be acceptable for the center server 2 to consist of a single server unit. Or it would also be possible for the center server 2 to be logically formed by employing cloud computing.

Each of the game machines 3 is built as a game machine for business use (i.e. for use in a commercial environment) that extracts payment of a predetermined playing charge from a user, and that allows the user to play a game to an extent corresponding to that playing charge. This type of game machine 3 is sometimes called an "arcade game machine". These game machines 3 are computer game apparatuses that are installed in predetermined institutions such as stores 6 or the like, with the principal objective being to increase profits by allowing a large number of users to play games repeatedly. It should be understood that an appropriate number of one or more game machines 3 are installed in each store 6. While the game machines 3 are drawn in FIG. 1 without any distinction, their hardware structure and their games may be selected as appropriate. The game machines 3 may be built as dedicated machines incorporating physical structures (for example operation units and so on) that are matched with specific games, or they may be built as general purpose machines that can handle games of various types by their software being rewritten.

On the other hand, the user terminal devices 4 are computer devices that can be connected to the network and that moreover are adapted for the use of individual persons. For example, a desktop type or book type personal computer 4a (hereinafter termed a "PC") or a mobile terminal device 4b like a portable telephone (including a smart phone) may be used as such a user terminal device 4. Furthermore, various types of computer device that can be connected to a network and that moreover are adapted to use by individuals such as console type game machines for household use, portable type game machines, portable type tablet terminal devices and so on may be used as such user terminal devices 4. By computer software of various types being implemented upon them, the user terminal devices 4 are capable of providing services of various types supplied by the center server 2 to their users.

The network 5 may have any appropriate structure, provided that it is capable of connecting each of the game machines 3 and the user terminal devices 4 to the center server 2. As one example, the network 5 may be configured so that it implements network communication by employing the TCP/IP protocol. Typically, the network 5 is constructed by the internet 5A which serves as a WAN and LANs 5B and 5C that connect the center server 2 and each of the game machines 3 to the internet 5A being connected together via routers 5D. The user terminal devices 4 may also be connected to the internet 5A by some appropriate structure. It should be understood that it would also be acceptable for local servers to be installed between the game machines 3 and the routers 5D of the stores 6, and for the game machines 3 to be connected via these local servers to the center server 2 so as to be capable of communication therewith. Moreover, in some cases, the server units 2A, 2B, ... of the center server 2 are mutually connected together by the WAN 5A, instead of or in addition to the LAN 5C.

Figure 2:
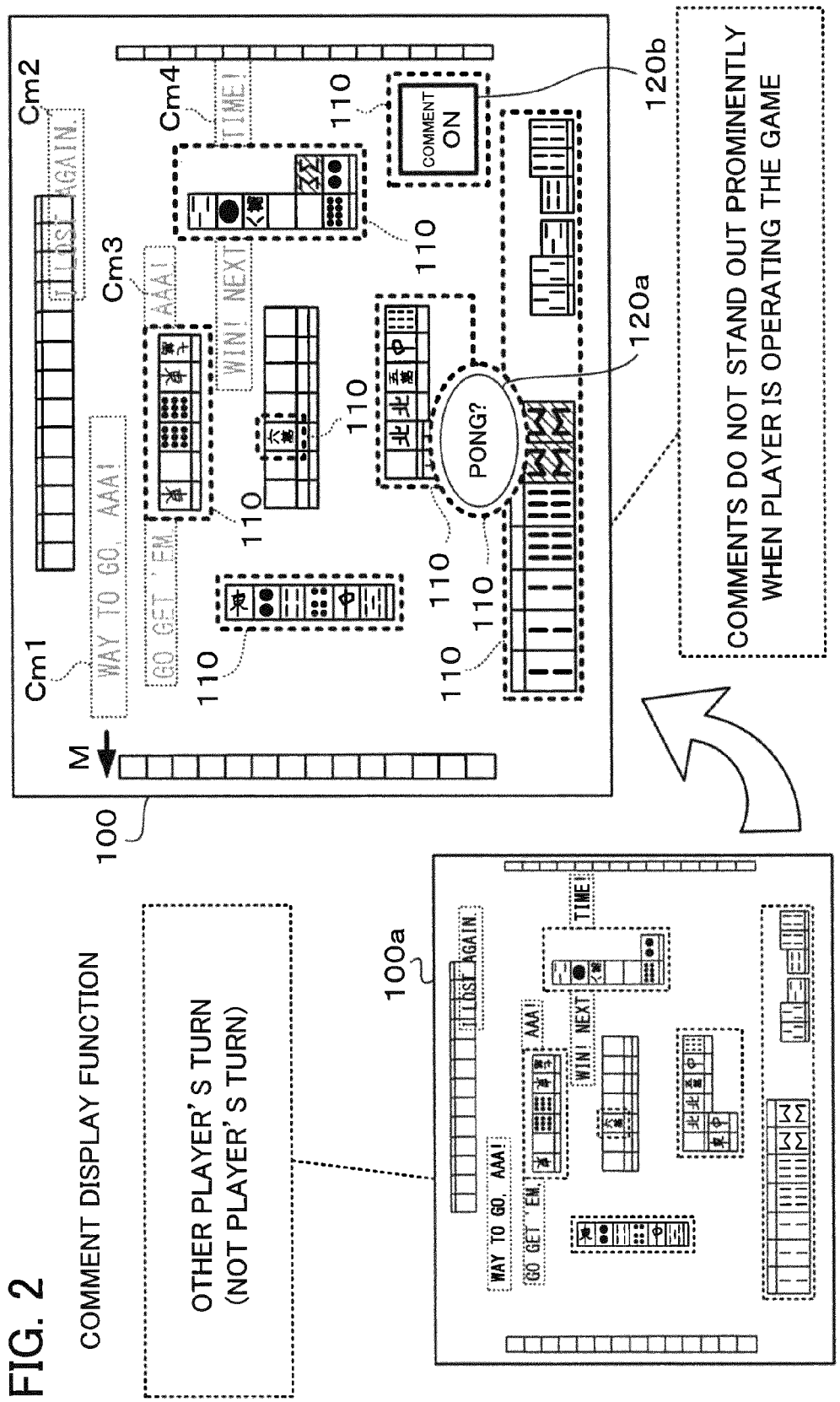
FIG. 2 is a figure for explanation of a comment display function that is implemented upon this game system.

Next, the comment display function implemented by this game system 1 will be explained with reference to FIG. 2. Each of the game machines 3 is provided with a monitor 37 upon which a game screen 100 is displayed and with a transparent touch panel 38 that is overlaid over the monitor 37. In this game system 1, comments Cm1, Cm2, ... addressed to the user and transmitted from other users (sometimes, in this specification, these will be referred to generically as "Cm") are displayed simultaneously upon the game screen 100, which is a screen for a mahjong game that can be played on the game machine 3. It should be understood that while the comments Cm in FIG. 2 are surrounded by rectangles shown by broken lines, these rectangular portions are not displayed upon the actual game screen 100. These comments Cm that are displayed are messages that are transmitted from user terminal devices 4 or game machines 3 that are being used by other users (i.e. players). The display of comments Cm shown in FIG. 2 is only an example; and, moreover, it is possible to create and to return a message in response to a comment. Operation by a player in connection with a comment Cm is received by the player's game machine 3 while the game is being played. Moreover, by user identification information corresponding to the player being authenticated by the center server 2, it is possible to employ a community function that is supplied to a user terminal device 4 from the center server 2. With this community function, operations such as reading a comment, creating a message, and replying can be performed.

As shown by the arrow sign M in the figure, each of these comments Cm shifts upon the game screen 100 at a predetermined speed from the right edge toward the left edge. If a display limitation region 110 is present upon a portion of the shift path of some comment Cm, then the display of that comment Cm is limited so that the comment Cm is not displayed in that display limitation region 110. In FIG. 2, when a character string in a comment Cm reaches the right edge of a display limitation region 110, this character string is displayed so as to shift instantaneously to the left edge of that region 110, avoiding the region 110. For example, to direct attention at the comment Cm3, i.e. "Go get 'em, AAA!", this is broken up so that the character string "Go get 'em," is displayed at the left side of the display limitation region 110 while the character string "AAA!" is displayed at the right side of the region 110. Regions surrounding the external peripheries of the mahjong tiles and the game operation buttons, which are needed for the game to progress, are designated as being such display limitation regions 110. It should be understood that per se known techniques of various types may be used for drawing the comments Cm upon the game screen 100.

In a mahjong game, in order to draw tiles and arrange a layout in turn with the other players (including a CPU), the time when the player operates in the game, is when the player's turn comes, or when the player performs an action such as "pong" or "chow" or the like in response to some other player discarding a tile, or the like. The player performs actions in the game by touching game operation buttons of various types that are shown upon the game screen 100. To explain this with reference to the game screen 100 of FIG. 2, when the player wants to perform "pong", the player touches and operates the operation window 120a, which is a game operation button.

If action by the player during the game play is not currently being required, then, as shown on the game screen 100a of FIG. 2, the comments Cm are displayed in a mode in which they are easy to identify (sometimes hereinafter this will be termed "normal display"). As an example of normal display, colors may be assigned to the character strings of the comments Cm so that they can be easily identified. Moreover, in the case of a very important character string or a character string that needs to be accentuated, it would also be possible to make that string stand out by being blinked or being shown more brightly or the like.

On the other hand, when the player is operating the game, the comments Cm are made to appear translucent, as shown in the game screen 100 of FIG. 2. Due to this, the comments Cm no longer stand out prominently, so that they cannot easily divert the attention of the player from the game. Accordingly, it becomes easier for the player to concentrate upon the game. The concept of the comments Cm becoming translucent means that their character strings are made somewhat transparent with respect to the background, and also includes their disappearing character strings. Moreover, during operation of the game, the movement speed of the comments Cm can become slower. Or, alternatively, it would also be acceptable to arrange for the comments Cm to stop moving altogether. If the player touches the operation window 120b in order to cancel this type of display control, then the system returns from this display control to normal display, even if the player is still operating the game.

Figure 3:
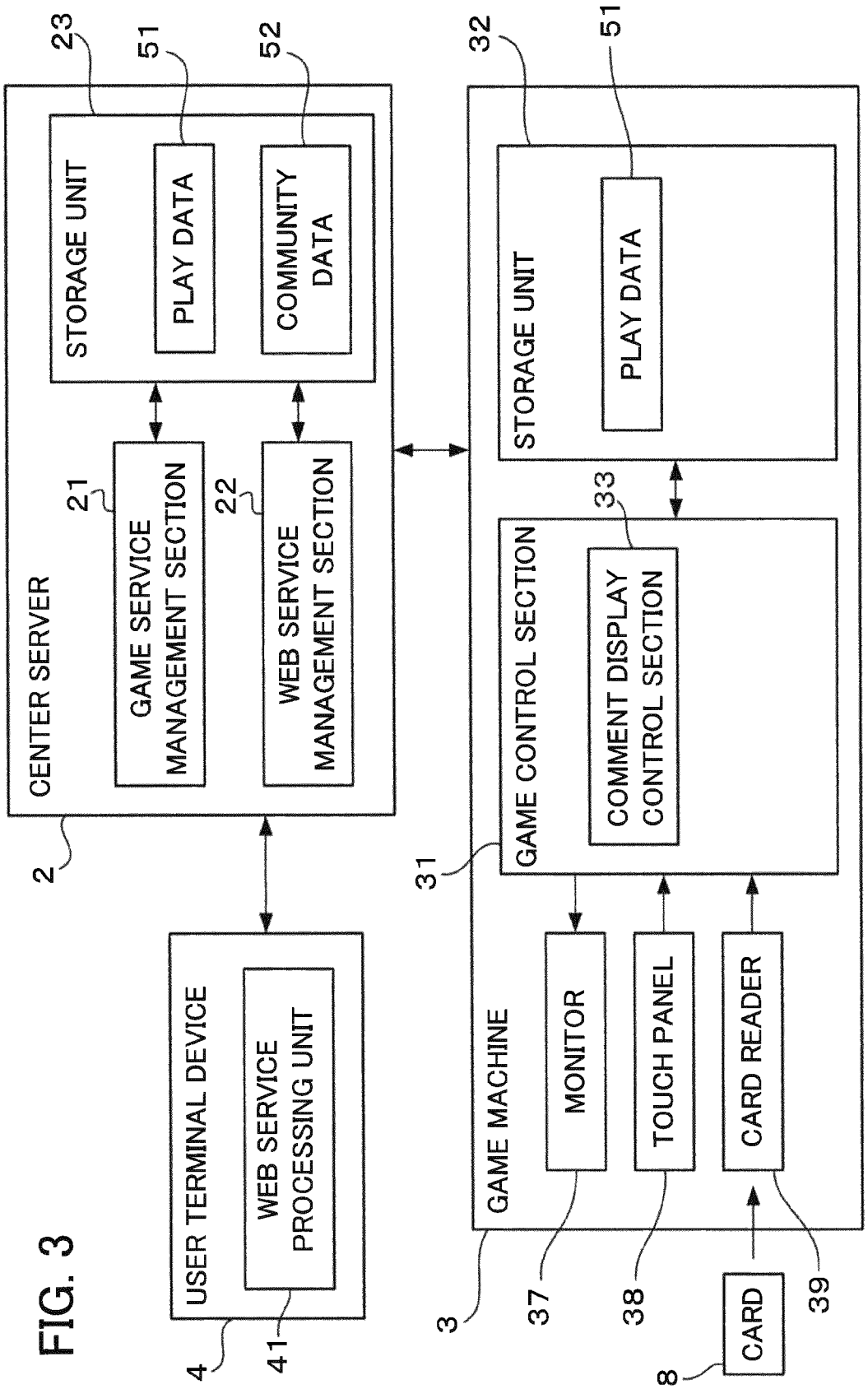
FIG. 3 is a functional block diagram for explanation of the structure of main portions of a control system of the game system.

FIG. 3 is a functional block diagram for explanation of the structure of main portions of a control system of the game system 1, related to the center server 2, to the game machines 3, and to the user terminal devices 4. The center server 2 includes a game service management section 21, a web service management section 22, and a storage unit 23. The management sections 21 and 22 are logical devices that are implemented as combinations of the computer hardware of the center server 2 (including its CPU and memory required for its operation, i.e. an internal storage device) and software. And the storage unit 23 is an external storage device that may be implemented as a storage unit such as a hard disk array or the like. The storage unit 23 could be constructed so as to hold all of its data in a single storage unit, or could be constructed so as to store the data dispersed over a plurality of storage units. While data of various types is stored in the storage unit 23, only play data 51 and community data 52 are shown in FIG. 3. The play data 51 is data in which details of the play of the game are stored, in order for the user to continue to play the game on each of the user's turns. The play data 51 is generated for each of the users, and is stored in the storage unit 23 in correspondence with the identification information for the users. In FIG. 3, only the play data 51 corresponding to the identification information for a single user is shown. And the community data 52 is data in which is recorded information of various kinds that must be referred to when the user employs community services. This community data 52 is also created for each of the users, and is recorded in the storage unit 23 in correspondence with the identification information for the users. Only the community data 52 corresponding to the identification information for a single user is shown in FIG. 3.

The game service management section 21 provides predetermined game services to the game machines 3. Such game services may, for example, be: the service of authenticating a user by receiving authentication information for the user from a game machine 3 (as one example, unique identification information and a unique password for each user), storing play data 51 received from a game machine 3 and corresponding to that user in the storage unit 23, or supplying play data 51 for a user that is stored in the storage unit 23 to a game machine; the service of enabling the users of a plurality of game machines 3 to participate in a communal game by matching them according to some condition; the service of updating the software (i.e. the game program or data) of a game machine 3 via the network 5, and so on.

The web service management section 22 provides web services of various types to the user terminal devices 4. As examples, the web service management section 22 may authenticate a user by receiving authentication information for the user (as one example, unique identification information and a unique password for each user) from a user terminal device 4, and may, in response to a request from that user who has been authenticated, supply the play data 51 for that user to the user terminal device 4 for perusal.

Moreover, a charging service function is also implemented upon the center server 2 of charging, to each user of the game machines 3 and of the user terminal devices 4, a payment as a consideration for supply of chargeable services in the game, and of collecting that payment from the user. In concrete terms, as a technique for performing such settlements, some method of electronic settlement for making payments by employing exchange of electronic data, such as with a credit card, a debit card, or an electronic payment system, may be employed, and any such method will be acceptable, provided that it is capable of charging the user a fee as consideration for a service, and of collecting the fee for such a consideration. No structure or procedure for implementing electronic settlement in concrete terms will be explained herein, since this is a per se known technology.

To continue, a game control section 31 and a storage unit 32 are provided to each of the game machines 3. The game control section 31 is a logical device that is implemented as a combination of the computer hardware of the game machine 3 (including its CPU and memory required for its operation, i.e. an internal storage device) and software. This game control section 31 performs control for executing calculations of various types required for the progression of the game, and also performs processing of various types required for exploiting the game services supplied by the game service management section 21 of the center server 2. A comment display control section 33 is provided to the game control section 31, and also is a logical device. For comments displayed upon the game screen 100, this comment display control section 33 performs control related to display. In concrete terms, the comment display control section 33 performs movement control to move the comments Cm in the direction of the arrow sign M, and performs control to limit the comment display when the player is operating the game and so on. The storage unit 32 is an external storage device that is implemented with a storage unit such as a hard disk, a semiconductor storage device, or the like. While data of various types is recorded in the storage unit 32, only the play data 51 supplied from the center server 2 is shown in FIG. 3.

Each of the user terminal devices 4 is provided with a web service processing unit 41, which is a logical device that is implemented as a combination of the computer hardware of the user terminal device 4 (including its CPU and memory required for its operation, i.e. an internal storage device) and software. This web service processing unit 41 performs processing required for exploiting services of various types that are provided by the web service management section 22 of the center server 2. For example, the web service processing unit 41 may perform processing required for creating comments for users who are playing on the game machines 3, and processing that is required for utilizing community functions, such as processing for transmission and reception and so on. It should be understood that, while an external storage device for storing appropriate data is also provided to the user terminal device 4, this is omitted from the figure.

Furthermore, input and output devices of various types such as a monitor 37, a touch panel 38, and a card reader 39 are provided to the game machine 3. The card reader 39 is a device for reading a card ID recorded upon a card 8 which the user possesses, which is one type of identification information which must be employed for authenticating a user, and which is unique for each card. It should be understood that the user identification information which must be employed for identifying a user may be different for authentication of the user upon a game machine 3 and for authentication of the user upon a user terminal device, or may be common. For example, it would be acceptable to arrange for a card ID that is recorded upon a card 8 of the user to be employed as identification information upon a game machine 3, so that this card ID and the play data 51 are stored in the storage unit 23 in mutual correspondence; while, on the other hand, upon a user terminal device 4, a user ID that is set uniquely for each user is utilized as identification information for the user. In this case, by providing a correspondence between the user IDs and the card IDs, it would be possible to employ either of these IDs as user identification information.

Figure 4:
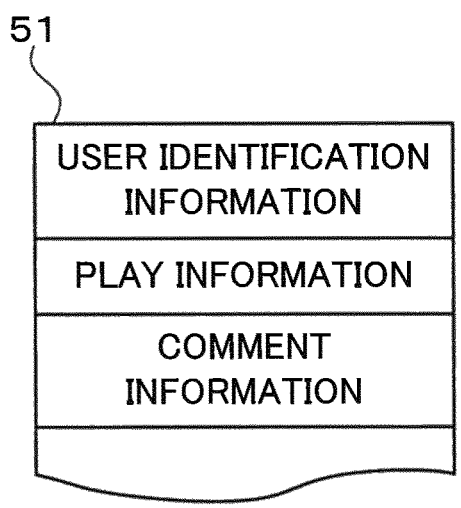
FIG. 4 is a figure showing an example of play data.

FIG. 4 shows an example of the play data 51. This play data 51 is data that is created for each user, and that has a structure in which various types of information required for playing the game, such as play information for the user who is the subject and comment information and so on, is recorded in correspondence with the identification information for that user (while the card ID is one example of such identification information, some other ID that corresponds with the card ID would also be acceptable). The play information is data in which results of various kinds correlated with playing the game are recorded, such as save data for games that the user has played on the game machine, the number of times that the user has played the game, the results the user has achieved, the user's grade, the number of points the user has acquired, and so on. And the comment information is data in which the user has recorded character strings that are to be transmitted to other users as comments from the game machine 3, and data in which comments that the user has received from other users are recorded. Apart from comments that have been prepared in advance, it would also be acceptable for these comments registered in this comment information that can be transmitted to include character strings specified by the user.

Figure 5:
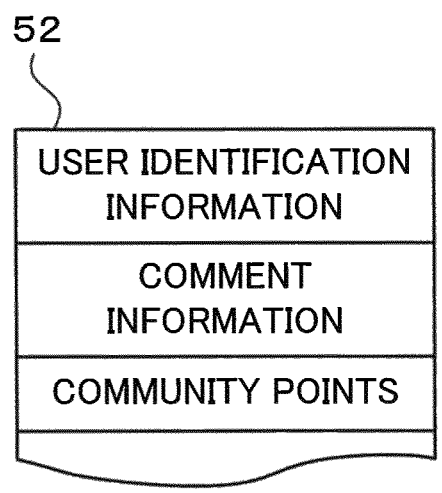
FIG. 5 is a figure showing an example of community data.

FIG. 5 shows an example of the community data 52. This community data 52 is data having a structure in which information such as comment information or a number of community points for the user who is the subject and so on is recorded in correspondence with the identification information for that user (while, for example, a community ID, the user ID, or the card ID may be used for the community function, the information specifying the user could be some other ID or the like that can be made to correspond to those IDs). Apart from the information explained in connection with the play data 51, the comment information could include a status for each comment determining whether or not it is as yet unread, whether or not it has yet been replied to, and so on. Appropriate information for the community function is recorded in the community data 52. The community points are points that are awarded to the user as benefits corresponding to the extent to which the user uses community services. These points may, for example, be consumed when using chargeable services supplied by the center server 2, or may be appropriated as a part of the charge for the game, or in order to receive a benefit of some kind in the game supplied by the game machine 3. Community points are awarded by the game system 1 when the user uses the community function to transmit or to receive a comment.

Figure 6:
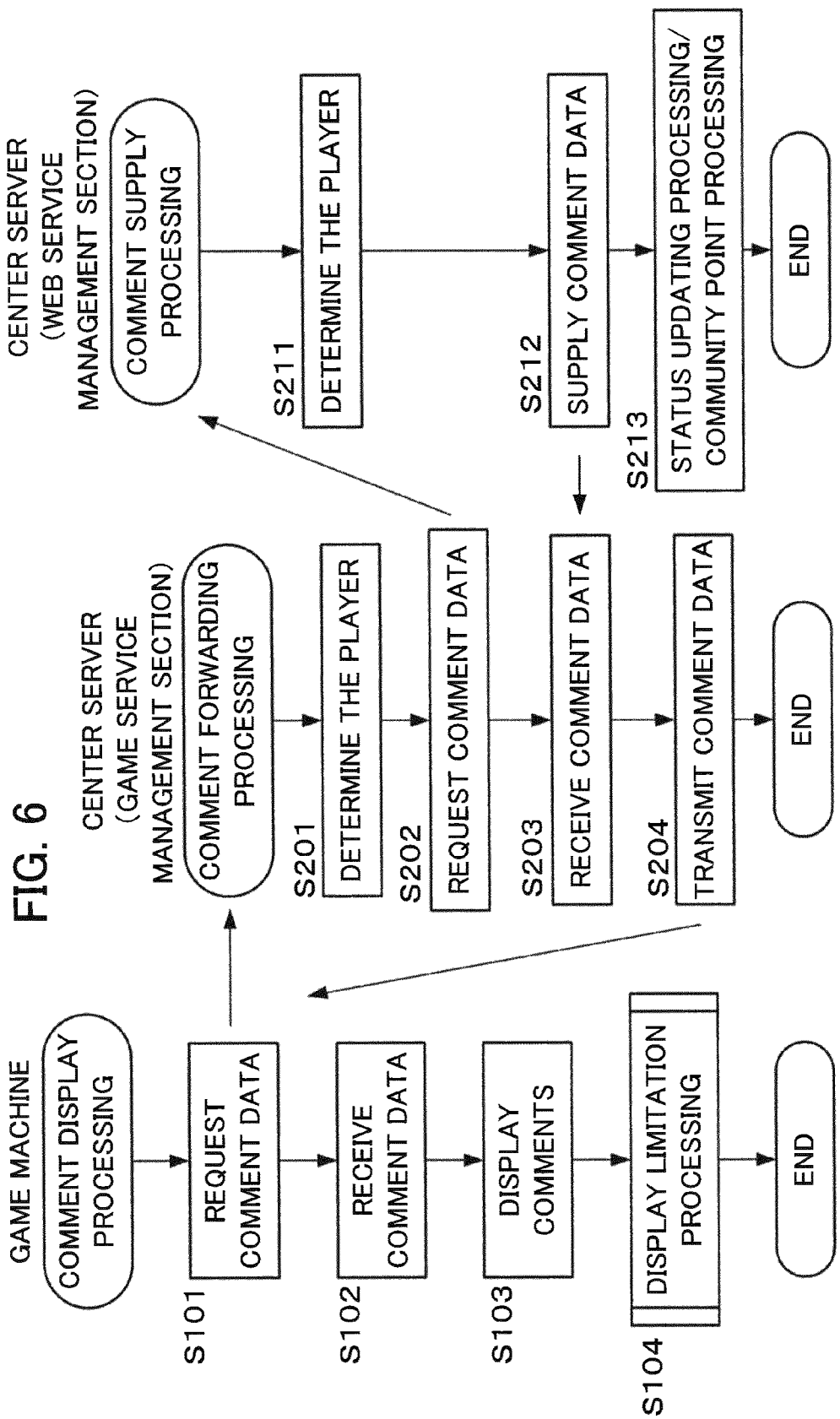
FIG. 6 is a flow chart showing comment display processing executed by a comment display control section of the game machine, and comment forwarding processing executed by a game service management section of a center server and comment supply processing executed by a web service management section of that server.

FIG. 6 is a flow chart showing comment display processing executed by the comment display control section 33 of the game machine 3, comment forwarding processing executed by the game service management section 21 of the center server 2 and comment supply processing executed by the web service management section 22 of the server 2. The processing when a comment Cm received from another user is to be displayed while the player is playing the game on the game machine 3 will now be explained with reference to FIG. 6. When an operation is to be performed to display a comment from another user upon the game screen 100 while the game is being played, the comment display control section 33 of the game machine 3 requests comment data to the center server 2 (a step S101). This comment data is at least a portion of the comment information described in the play data 51; for example, it may be information related to comments that have not yet been read. The comment data that is requested may also be specified as appropriate by the player, such as, for example, comments from a specific user, or the like.

When this comment data is requested from the game machine 3, the game service management section 21 of the center server 2 performs comment forwarding processing, and determines the player of the game machine 3 on the basis of his or her identification information (a step S201). Next, the game service management section 21 requests the web service management section 22 to supply comment data corresponding to the user (a step S202). Upon receipt of this request from the game service management section 21, the web service management section 22 performs comment supply processing by determining the identification information for this player (i.e. user) (a step S211), and by supplying (a step S212) to the game service management section 21 the requested comment data, among the comment information included in the community data 52, that corresponds to this identification information (for example, to the community ID). And the web service management section 22 performs status updating processing and community point addition processing upon this community data (a step S213).

On the other hand, upon receipt of supply of comment data from the web service management section 22 (a step S203), the game service management section 21 updates the comment information included in the play data 51, and also transmits the comment data to the game machine 3 (a step S204). And, upon receipt of this comment data (a step S102), the comment display control section 33 of the game machine 3 displays upon the game screen 100 the comment Cm related to this comment data that has been received (a step S103). This comment Cm is displayed while being shifted at a predetermined speed in the direction of the arrow sign M, as shown in FIG. 2. The comments Cm that are received are displayed upon the game screen 100 in sequence at appropriate timings. During this comment display, the comment display control section 33 executes display limitation processing that will be described hereinafter, and then this cycle of the processing terminates. In this processing, the processing of the steps S101 through S104 executed by the comment display control section 33 functions as the "comment display control device".

Figure 7:
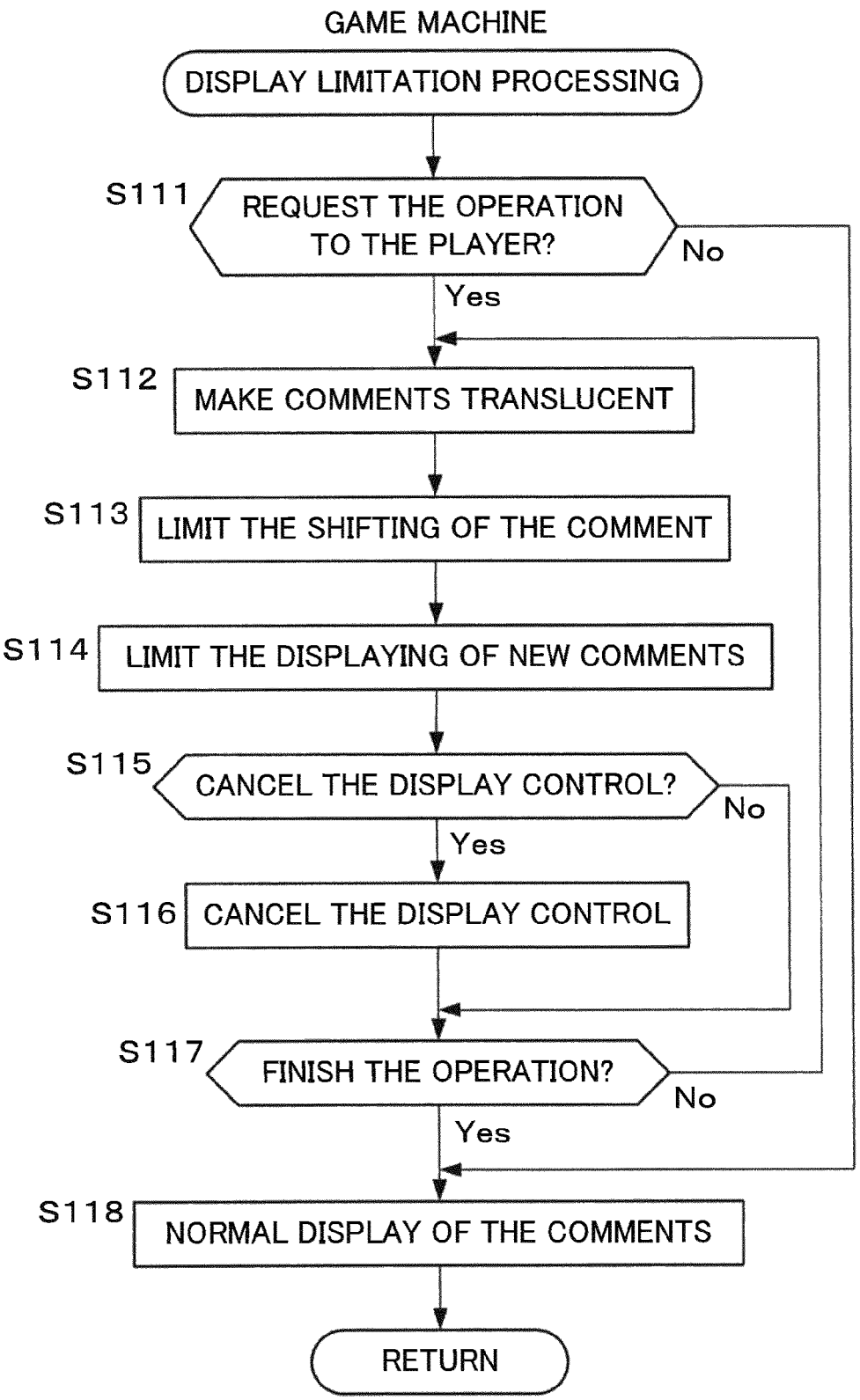
FIG. 7 is a flow chart showing display limitation processing executed by the comment display control section of the game machine.

FIG. 7 is a flow chart showing the above display limitation processing that is executed by the comment display control section 33 of the game machine 3. The details of the processing of the step S104 of the FIG. 6 processing will now be explained with reference to FIG. 7. This display limitation processing is executed when a comment Cm is being displayed upon the game screen 100. First, the comment display control section 33 determines whether or not operation of the game is being requested to the player (a step S111). As examples, when in a mahjong game the turn of the player to play comes around, operation of the game that is requested to the player may be operation to select a tile to be discarded, or operation to perform "riichi (call)". Moreover, even when some other player has discarded a tile, according to the circumstances, it may be operation to perform "pong" or the like. Normally, when there is a request to the player to operate the game, a predetermined interval is set in advance, and operational input by the player becomes possible during that interval. This period during which operational input is possible is from when the request to the player to operate is made, until the player performs operation, or until the predetermined interval ends. To explain this in terms of the game screen 100 of FIG. 2, the interval during which the operation window 120a for performing "pong" is displayed is the interval in which operation of the game is being requested to the player. If no request is being made to the player to operate the game, then the comment display control section 33 transfers the flow of control to a step S118, in which the comment Cm is displayed normally, and then this cycle of the processing terminates.

If there is a request to the player to operate, then the comment display control section 33 makes the character string for the comment Cm that is being displayed upon the game screen 100 translucent (a step S112). A per se known technique may be employed for making the character string translucent. It would also be possible for the degree of translucency to be set by the player. Next, the comment display control section 33 limits the shifting of the comment Cm (a step S113). In concrete terms, the comment display control section 33 performs control so as to reduce the speed of shifting of the comment Cm as it is displayed upon the game screen 100, as compared with its shifting speed during normal display. Or, alternatively, it would also be acceptable to make the display of the comment Cm stop shifting completely. And the comment display control section 33 reduces the number of comments that are displayed (a step S114). To explain this with reference to the game screen of FIG. 2, although the character strings for the comments Cm are displayed sequentially from the right edge of the screen, the number of comments that newly appear is reduced. Or, it would also be acceptable to arrange to stop the display of novel comments Cm entirely.

And, while display control is being performed, the comment display control section 33 determines whether or not the player has touched the operation window 120b (refer to FIG. 2) in order to cancel this display control (a step S115). If the player has touched the operation window 120b, then the comment display control section 33 cancels the display control (a step S116). The fact that operation has been inputted upon the operation window 120b is set as the condition for cancellation. The comment display control section 33 returns the display of the comment Cm to normal display even while the player is operating the game. Due to this, the wish of a player who wants to see the comments Cm even though the player is operating the game, or the wish of a player, depending upon the details of the game, to give priority to the display of comments Cm is implemented, and accordingly it is possible to enhance the flexibility for operating the game. On the other hand, if the player has not performed touch operation upon the operation window 120b, then the comment display control section 33 skips this step S116 and the flow of control proceeds to a step S117.

Thereafter, the comment display control section 33 determines whether or not operation by the player of the game has ended (the step S117). To explain this with reference to the game screen of FIG. 2, for example, the operation of the game by the player ends when the player has operated the operation window 120a in order to perform "pong", or when the player has been performed some operation that is not performing "pong". When the operation of the game by the player has ended, the comment display control section 33 returns to normal display of the comments Cm (the step S118), and this cycle of the processing terminates. On the other hand, if the operation of the game by the player has not ended, then the comment display control section 33 returns the flow of control to the step S112, and the processing described above is continued.

By the processing described above, if a comment Cm is being displayed upon the game screen 100 while the game is being played, when a request is made to the player to operate the game (the step S111), the display of the comment Cm is limited (the steps S112 through S114). This limitation of display of comments Cm can be cancelled according to the wish of the player (the steps S115 and S116). And, when the player has finished operating the game (the step S117), the turn in the game reverts to another player, and the comments Cm are subsequently displayed normally without any request due to action by the player (the step S118). In the processing described above, the processing of the step S111 executed by the comment display control section 33 functions as the "operation request determination device", the processing of the steps S112 through S114 functions as the "display limitation device", and the processing of the steps S115 and S116 functions as the "limitation cancellation device".

The present invention should not be considered as being limited to the embodiment described above; it would be possible to implement it in various different forms. For example in the above embodiment, as an example of limitation of the display of the comments Cm, it was explained that, in the step S112 of the display limitation processing, the character strings for the comments Cm were made to be translucent; but this is not to be construed as being limitative. It would also be acceptable, for example, to make the colors of the character strings for the comments Cm to be of the same general color as the color of the background, or to gray out those character strings. The objective of making the comments Cm translucent is to ensure that the display of the comments Cm does not constitute any hindrance to the operation of the game by the player; but any appropriate changes can be made, provided that they ensure that the comments Cm are drawn so that they do not stand out. Moreover, while the steps S112 through S114 were explained as implementing limitation of the display of the comments Cm, they are not to be considered as being limitative. For example, it would be acceptable for at least one of the steps S112 through S114 to be executed; it is not necessary for the processing of all three of them to be executed at the same time. It would also be acceptable to change the combination of these various steps, according to the circumstances. Moreover, apart from the three steps S112 through S114, it would also be acceptable to arrange for the character strings for the comments Cm to be made smaller while the player is operating the game, or to arrange for them to be displayed as all collected together into some predetermined region. Any variations that are appropriate may be implemented.

While in the embodiment described above it was explained that the operation window 120b for cancellation was provided as the condition for cancellation of the limitation of the display while the player is operating the game, this is not to be considered as being limitative. For example, it would also be acceptable, in the environment settings for the player, to arrange for the limitation of display of the comments Cm to be set to ON or OFF when the player is operating the game. It would also be possible to set the fact that the display limitation is put to OFF as the condition for cancellation. In this case as well, it would be possible to provide the operation window 120b for limiting the display or for cancelling that limitation, so that the player is able to change that setting according to the progression of the game.

Figure 8:
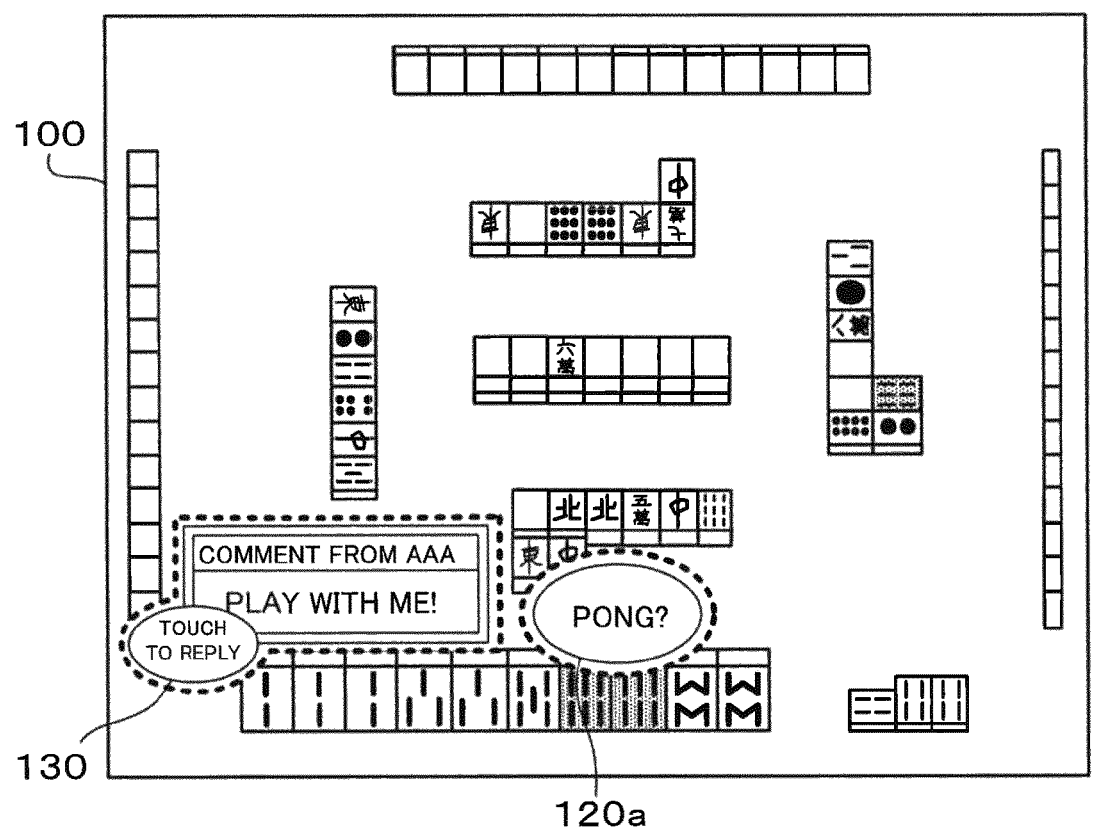
FIG. 8 is a figure in which an example of a comment window is displayed upon a game screen.

In the embodiment described above, the explanation was made in terms of the comments Cm scroll shifting over the game screen 100, but the display of the comments Cm is not to be considered as being limited by this feature. For example, as shown in FIG. 8, it would also be possible to display a comment window 130 in which the contents of the comments are displayed, instead of simply displaying the comments Cm. In this case, during normal display, it will be acceptable for the comment window 130 to be pop-up displayed in some appropriate position, and, when a request for the player to operate in the game is made, for this pop-up display to be interrupted. In this case, instead of the display limitation processing of the steps S112 through S114, processing may be provided to interrupt the pop-up display. It would also be possible, in this case as well, to arrange to make the comment window that is already being displayed translucent. It would also be possible to make the comment window 130 shift in a predetermined direction after it has been pop-up displayed, or to reduce or to stop the speed of shifting of the comment window 130 while the player is operating the game. Yet further, this technique is not to be considered as being limited to the comment window 130; it would also be possible to arrange to perform pop-up display of the comments Cm themselves.

While, in the embodiment described above, the explanation was made in terms of a game machine 3 being the game apparatus, this is not to be considered as being limitative. For example, it would be acceptable for a computer device for individual use, such as a user terminal device 4, to be employed as the game apparatus. Moreover, while a touch panel 38 has been explained as being the operation input unit, this is not to be considered as being limitative. It would also be acceptable to arrange to employ a pointing device of any of various types such as a mouse, a touch pad, or the like for operating the pointer that is displayed upon the game screen. Moreover, while in the above explanation the game performed upon the game machine 3 is a mahjong game, this is not to be construed as being limitative. The present invention could also be applied to any of various types of game, such as, for example, to a competitive type of board game such as shogi, go, sugoroku or the like, or to a card game, to a music game, to a quiz game, to a RPG game, or the like.

What is claimed is:

1. A game system including a game apparatus upon which a user is enabled to play a game, the game system comprising:
    a storage unit storing at least one comment in association with a user; and
    a comment display control device configured to obtain the at least one comment associated with the user playing the game from the storage unit and display the at least one comment upon a game screen dedicated for display of a state of the game the user is playing upon the game apparatus, wherein the comment display control device comprises:
        an operation request determination device configured to determine whether or not a request is being made to the user to operate the game the user is playing, the game being displayed on the game screen; and
        a display limitation device configured to impose a predetermined limitation upon the display of the at least one comment on the game screen for the game the user is playing in a case that the operation request determination device determines that the request is being made, regardless of whether or not an operation to the request is performed by the user.

2. A game system according to claim 1, wherein, in the case that the operation request determination device determines that the request is being made, the display limitation device makes the at least one comment translucent.

3. A game system according to claim 2, wherein the comment display control device shifts the at least one comment in a predetermined direction; and
    in the case that the operation request determination device determines that the request is being made, the display limitation device makes a shifting speed of the at least one comment lower, as compared with when no request to operate the game is being made.

4. A game system according to claim 3, wherein, in the case that the operation request determination device determines that the request is being made, the display limitation device stops the shifting of the at least one comment.

5. A game system according to claim 1, wherein:
    the comment display control device shifts the at least one comment in a predetermined direction; and
    in the case that the operation request determination device determines that the request is being made, the display limitation device makes a number of pieces of comments appearing newly upon the game screen lower, as compared with a number of pieces appearing when no request to operate the game is being made.

6. A game system according to claim 1, wherein:
    the comment display control device performs pop-up display of the at least one comment upon the game screen; and
    the display limitation device interrupts the pop-up display of the at least one comment appearing newly upon the game screen, in the case that the operation request determination device determines that the request is being made.

7. A game system according to claim 1, wherein the comment display control device further comprises a limitation cancellation device configured to cancel the imposed predetermined limitation by the display limitation device and return the display of the at least one comment to a normal display on the game screen upon receiving an input from the user during the game the user is playing.

8. A comment display control method for a game system including a storage unit and a game apparatus upon which a user is enabled to play a game, and configured to display at least one comment upon a game screen dedicated for display of a state of the game the user is playing upon the game apparatus, comprising:
    a storing step of storing the at least one comment in association with a user in the storage unit;
    an obtaining step of obtaining the at least one comment associated with the user playing the game being displayed on the game screen from the storage unit;
    an operation request determination step of determining whether or not a request is being made to the user to operate the game the user is playing, the game being displayed on the game screen; and
    a display limitation step of imposing a predetermined limitation upon the display of the at least one comment on the game screen for the game the user is playing in a case that the request is being made in the operation request determination step, regardless of whether or not an operation to the request is performed by the user.

9. A storage medium storing a computer program to cause a computer of a game system including a game apparatus upon which a user is enabled to play a game to function as:
    a storage unit storing at least one comment in association with a user; and
    a comment display control device configured to obtain the at least one comment associated with the user playing the game from the storage unit and display the at least one comment upon a game screen dedicated for display of a state of the game the user is playing upon the game apparatus, wherein the comment display control device comprises:
        an operation request determination device configured to determine whether or not a request is being made to the user to operate the game the user is playing, the game being displayed on the game screen; and
        a display limitation device configured to impose a predetermined limitation upon the display of the at least one comment on the game screen for the game the user is playing in a case that the operation request determination device determines that the request is being made, regardless of whether or not an operation to the request is performed by the user.

* * * * *